US012686732B2

(12) United States Patent
Zheng et al.

(10) Patent No.: US 12,686,732 B2
(45) Date of Patent: Jul. 21, 2026

(54) IONOMER COMPOSITION AND IONOMER FILM PREPARED THEREFROM

(71) Applicants: SK Innovation Co., Ltd., Seoul (KR); SK Geo Centric Co., Ltd., Seoul (KR)

(72) Inventors: Yong Zheng, Daejeon (KR); Soon Min Kwon, Daejeon (KR); Ki Yup Kim, Daejeon (KR); Sang Yeup Lee, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 907 days.

(21) Appl. No.: 17/987,995

(22) Filed: Nov. 16, 2022

(65) Prior Publication Data

US 2024/0158546 A1 May 16, 2024

(51) Int. Cl.
C08F 20/14 (2006.01)
C08K 3/36 (2006.01)

(52) U.S. Cl.
CPC ................ C08F 20/14 (2013.01); C08K 3/36 (2013.01)

(58) Field of Classification Search
CPC ........ C08F 20/14; C08K 3/36; C08J 2323/08; C08J 5/18; C08L 2201/10; C08L 2203/16; C08L 23/0876; C08L 23/0869
See application file for complete search history.

(56) References Cited

U.S. PATENT DOCUMENTS 8,475,932 B2    7/2013  Morken

FOREIGN PATENT DOCUMENTS

| | | |
|---|---|---|
| JP | H04288353 A | 10/1992 |
| JP | H07316368 A | 12/1995 |
| JP | H09143283 A | 6/1997 |
| JP | 2005516798 A | 6/2005 |
| KR | 1020150067324 A | 6/2015 |

OTHER PUBLICATIONS

Tena et al, Qualicer, 2016, p. 1-10 https://www.researchgate.net/publication/260298466_RELATIONSHIP_BETWEEN_THE_SPECIFIC_SURFACE_AREA_PARAMETERS_DETERMINED_USING_DIFFERENT_ANALYTICAL_TECHNIQUES (Year: 2014).*
PQ Silicas Gel Webinar, 2020 https://sammorell.com/My_Documents/Companies/PQ/Presentations/PQ_Gasil_and_Silcron_Silicas.pdf (Year: 2020).*
Technical Datasheet of Gasil 200DF (Year: 2024).*

* cited by examiner

*Primary Examiner* — Catherine S Branch
*Assistant Examiner* — Olga Lucia Donahue
(74) *Attorney, Agent, or Firm* — The Webb Law Firm

(57) ABSTRACT

Provided are an ionomer composition including silica particles which satisfy a specific equation and are acidic in an aqueous solution state and an ionomer film produced therefrom. The ionomer composition has excellent miscibility, and when a film is produced using the composition, surface appearance such as transparency is well-improved, and wear resistance, coefficient of friction, and the like of the film are significantly improved.

15 Claims, 1 Drawing Sheet

IONOMER COMPOSITION AND IONOMER FILM PREPARED THEREFROM

BACKGROUND OF THE INVENTION

FIELD OF THE INVENTION

The following disclosure relates to an ionomer composition and an ionomer film produced therefrom.

DESCRIPTION OF RELATED ART

An ionomer refers to a thermoplastic plastic comprising both a covalent bond and an ionic bond, and may be an ethylene-based ionomer such as an ethylene-methacrylic acid copolymer or an ethylene-acrylic acid copolymer, for example. In general, an ionomer is being used for bonding, coating, and the like in food packaging films, trays, pouches, and containers.

A conventional ionomer is mainly used for interior coating of an opaque container having less appearance importance due to its poor optical properties and defects in appearance, and specifically, it is because the ionomer lacks transparency by its high haze, does not have a smooth surface when produced into a coating or film, and has a plurality of bad elements such as a fish eye observed on the surface.

In addition, when the ionomer is produced into a film, a strong interaction between wound films occurs by a remaining acrylic acid of the ionomer, and since film blocking shown by the strong interaction causes a big problem with film unwinding in a subsequent film processing, an anti-blocking agent is added for improving slipperiness, but as the ionomer applied for a film, an ionomer having excellent transparency is used, and thus, when the antiblocking agent is applied, a haze is increased to deteriorate the transparency of a product.

In order to solve the problem, another additive is added to promote the improvement of transparency, but a significant effect was not shown, and also, resistance to external stimuli such as wear resistance as well as transparency is needed for being used on the outside of a product, but these are not satisfied.

Therefore, in order to secure stable film processability, it is necessary to research and develop an ionomer composition which has excellent slipperiness, has a minimized increase in haze to have excellent transparency, has excellent surface appearance to be applied to a use where visual appeal is important, and has excellent mechanical properties such as wear resistance to be applied to appearance.

SUMMARY OF THE INVENTION

An embodiment of the present invention is directed to providing an ionomer composition having excellent miscibility and excellent transparency and mechanical properties.

Another embodiment of the present invention is directed to providing an ionomer film having excellent surface appearance such as transparency, excellent mechanical properties such as wear resistance, and excellent slipperiness.

In order to solve the above problems, the present inventors found that when an ionomer composition includes silica particles which satisfy a specific equation and are acidic in an aqueous solution state, the miscibility of the ionomer composition is excellent, and thus, when the composition is produced into a film, surface appearance such as transparency is improved well, and slipperiness, such as wear resistance and coefficient of friction of the film, is significantly improved, thereby completing the present invention.

In one general aspect, an ionomer composition includes: an ethylene-(meth)acrylic acid ionomer and silica particles, wherein an aqueous solution including the silica particles at a concentration of 50 mg/ml has an acidic pH, and the silica particles satisfy the following Equation 1:

$$\frac{V_{pore}}{A \times Dv(50)} \geq 0.1 \qquad \text{[Equation 1]}$$

wherein $V_{pore}$ is a pore volume (ml/g), A is an effective area (m²/kg), and Dv(50) is a particle diameter (μm) corresponding to 50% of volume accumulation of a particle size distribution.

In an exemplary embodiment, the silica particles may have a ratio between FWHM and FWQM (FWQM/FWHM) of the particle size distribution of 1.5 or less.

In an exemplary embodiment, the silica particles may have Dv(50) of 1 to 10 μm.

In an exemplary embodiment, the aqueous solution including the silica particles at a concentration of 50 mg/ml may have a pH of 2 to 5.

In an exemplary embodiment, the silica particles may have a pore volume of 0.2 to 5 ml/g.

In an exemplary embodiment, the silica particles may have an effective area of 2000 to 2500 m²/kg.

In an exemplary embodiment, the silica particles may have a bulk density of 0.02 to 5 g/ml.

In an exemplary embodiment, the silica particles may be included at 0.1 to 0.5 wt % with respect to the total weight of the ionomer composition.

In an exemplary embodiment, the ethylene-(meth)acrylic acid ionomer may include 5 to 15 wt % of a (meth)acrylic acid repeating unit.

In an exemplary embodiment, the ethylene-(meth)acrylic acid ionomer may have a degree of neutralization by one or two or more metals selected from the group consisting of lithium, sodium, potassium, calcium, magnesium, manganese, cobalt, nickel, copper, zinc, and lead of 25 to 60%.

In an exemplary embodiment, a melt flow index of the ethylene-(meth)acrylic acid ionomer composition may be 1 to 10 g/10 min as measured in accordance with ISO 1133-1 (2011).

In another general aspect, an ionomer film produced from the ionomer composition is provided.

In an exemplary embodiment, the film may have a maximum coefficient of static friction ($\mu_s$) of 0.2 or less as measured in accordance with ISO 8295.

In an exemplary embodiment, the film may have a wear resistance test result value of 40 mg or less as measured in accordance with ASTM 4060.

In an exemplary embodiment, the film may have a haze of 15% or less as measured in accordance with ASTM D1003.

Other features and aspects will be apparent from the following detailed description, the drawings, and the claims.

DESCRIPTION OF THE INVENTION

Hereinafter, the present invention will be described in more detail. However, the following examples or embodiments are only a reference for describing the present invention in detail, and the present invention is not limited thereto and may be implemented in various forms.

In addition, unless otherwise defined, all technical terms and scientific terms have the same meanings as those commonly understood by one of those skilled in the art to which the present invention pertains.

The terms used herein are only for effectively describing a certain embodiment, and are not intended to limit the present invention.

In addition, the singular form used in the specification and claims appended thereto may be intended to include a plural form also, unless otherwise indicated in the context.

In addition, unless particularly described to the contrary, "comprising" any elements will be understood to imply further inclusion of other elements rather than the exclusion of any other elements.

In addition, the term "(meth)acrylic acid" in the present specification may refer to methacrylic acid or acrylic acid.

In addition, the numerical range used in the present specification may include all values within the range including the lower limit and the upper limit, increments logically derived in a form and span in a defined range, all double limited values, and all possible combinations of the upper limit and the lower limit in the numerical range defined in different forms. Unless otherwise defined in the specification of the present invention, values which may be outside a numerical range due to experimental error or rounding of a value are also included in the defined numerical range.

Hereinafter, the present invention will be described in more detail.

The present disclosure provides an ionomer composition including an ethylene-(meth)acrylic acid ionomer and silica particles. Or, an aqueous solution including the silica particles at a concentration of 50 mg/ml has an acidic pH, and the silica particles are characterized by satisfying the following Equation 1:

$$\frac{V_{pore}}{A \times Dv(50)} \geq 0.1 \qquad \text{[Equation 1]}$$

wherein $V_{pore}$ is a pore volume (ml/g), A is an effective area (m²/kg), and Dv(50) is a particle diameter (μm) corresponding to 50% of volume accumulation of a particle size distribution.

Or, the silica particles may satisfy the following Equation 2:

$$0.1 \leq \frac{V_{pore}}{A \times Dv(50)} \leq 0.3. \qquad \text{[Equation 2]}$$

Or, the silica particles may satisfy the following Equation 3:

$$0.1 \leq \frac{V_{pore}}{A \times Dv(50)} \leq 0.2. \qquad \text{[Equation 3]}$$

In Equations 2 and 3, $V_{pore}$, A, and Dv(50) are as described in Equation 1.

Figure 1:
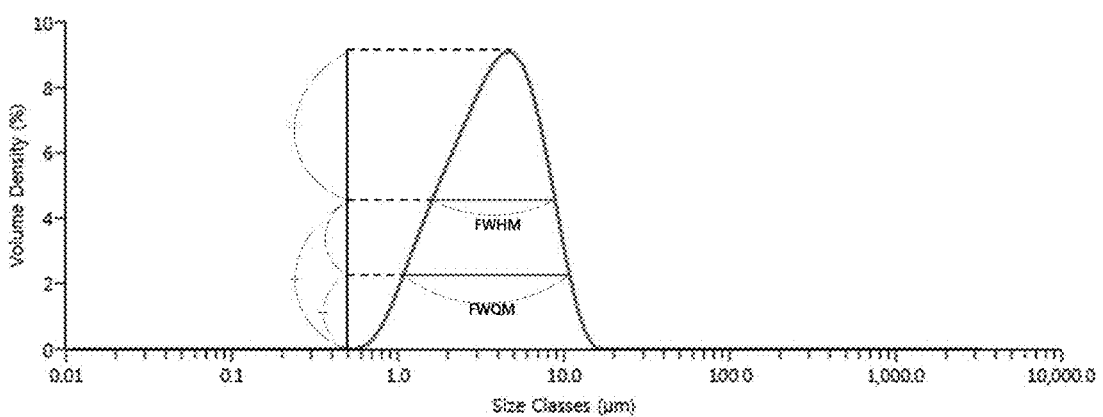
FIG. 1 shows FWHM and FWQM in a particle size distribution diagram of silica particles [1].

According to an exemplary embodiment, the ionomer composition including the silica particles satisfying Equation 1, or Equation 2, or Equation 3 has excellent miscibility, has well-improved surface appearance such as transparency when produced into a film, and may have significantly improved wear resistance and coefficient of friction of the film. According to an exemplary embodiment, the silica particles may have a ratio between full width half maximum (FWHM) and full width quarter maximum (FWQM) (FWQM/FWHM) of 1.7 or less, or 1 to 1.5, and or 1.2 to 1.4. As seen in FIG. 1, FWHM refers to a value of difference between a maximum particle diameter and a minimum particle diameter at a maximum value in the particle size distribution, and FWQM refers to a value of difference between a maximum particle diameter and a minimum particle diameter at 25% of a maximum value in the particle size distribution.

According to an exemplary embodiment, Dv(10) of the silica particles may be 0.1 to 5 μm, or 0.5 to 3 μm, or 1 to 2 μm. Dv(10) is a particle diameter (μm) corresponding to 10% of volume accumulation of the particle size distribution.

According to an exemplary embodiment, Dv(50) of the silica particles may be 1 to 10 μm, or 1 to 5 μm, or 2 to 5 μm.

According to an exemplary embodiment, Dv(90) of the silica particles may be 1 to 15 μm, or 3 to 10 μm, or 5 to 8.5 μm. Dv(90) is a particle diameter (μm) corresponding to 90% of volume accumulation of the particle size distribution.

According to an exemplary embodiment, an aqueous solution including the silica particles at a concentration of 50 mg/ml may have a pH of 1 to 7, or 2 to 5, or 3 to 4.

According to an exemplary embodiment, the silica particles may have a pore volume of 0.2 to 5 ml/g, or 0.5 to 4 ml/g, or 0.8 to 2 ml/g.

According to an exemplary embodiment, the silica particles may have an effective area of 1000 to 5000 m²/kg, or 1500 to 3000 m²/kg, or 2000 to 2500 m²/kg.

According to an exemplary embodiment, the silica particles may have a bulk density of 0.02 to 5 g/ml, or 0.02 to 3 g/ml, or 0.05 to 1 g/ml.

According to an exemplary embodiment, the silica particles may be included at 0.01 to 5 wt %, or 0.05 to 2 wt %, or 0.1 to 0.5 wt % with respect to the total weight of the ionomer composition.

According to an exemplary embodiment, the ethylene-(meth)acrylic acid ionomer may include 1 to 30 wt %, or 5 to 25 wt %, or 5 to 15 wt % of the (meth)acrylic acid repeating unit. In addition, the (meth)acrylic acid may be an acrylic acid or a methacrylic acid.

According to an exemplary embodiment, the ethylene-(meth)acrylic acid ionomer may have a degree of neutralization by one or two or more metals selected from the group consisting of lithium, sodium, potassium, calcium, magnesium, manganese, cobalt, nickel, copper, zinc, and lead of 5 to 50%, or 25 to 60%, or 30 to 55%. In addition, the metal may be zinc, sodium, or potassium.

According to an exemplary embodiment, a melt flow index of the ethylene-(meth)acrylic acid ionomer composition may be 0.5 to 10 g/10 min, or 1 to 10 g/10 min, or 1 to 5 g/10 min, as measured in accordance with ISO 1133-1 (2011).

The present disclosure may provide an ionomer film produced from the ionomer composition. The ionomer film may have a thickness of 1 μm to 500 mm or 10 μm to 10 mm, but is not limited thereto.

According to an exemplary embodiment, the film may have a maximum coefficient of static friction ($\mu_s$) of 0.1 to 0.5, or 0.2 or less, as measured in accordance with ISO 8295.

According to an exemplary embodiment, the film may have a maximum coefficient of kinetic friction ($\mu_d$) of 0.1 to 0.5, or 0.2 or less, or 0.15 or less, as measured in accordance with ISO 8295.

According to an exemplary embodiment, the film may have a wear resistance test result value of 40 mg or less, or 38 mg or less, or 1 to 38 mg, as measured in accordance with ASTM 4060.

According to an exemplary embodiment, the film may have a haze of 15% or less, or 1 to 13%, or 5 to 12%, or 10% or less, as measured in accordance with ASTM D1004, when its thickness is 100±1 μm.

Hereinafter, the present invention will be described in more detail with reference to the examples and the comparative examples. However, the following examples and comparative examples are only one example for describing the present invention in more detail, and do not limit the present invention in any way.

The physical properties of the following examples and comparative examples were measured by the following methods.

Method of Evaluating Physical Properties 1. pH

Silica particles were dissolved in water at a concentration of 50 mg/ml and then filtered with a filter to filter out an insoluble matter to prepare a sample solution, and the pH of the sample solution was measured using a pH meter (Mettler Toledo, S400) and is shown in the following Table 1.

2. Pore Volume [ml/g] and Bulk Density [g/ml]

The pore volume of silica particles was measured by a BET nitrogen adsorption method, and is shown in the following Table 1.

In addition, 2.5 g of silica particles were added to a 50 ml plastic tube to measure the volume (ml), which was divided by the number of grams (2.5 g) to calculate a bulk density, and the calculated value is shown in the following Table 1.

3. Effective Area [m²/kg]

The effective area of silica particles was measured using a laser diffraction particle size analyzer (Malvern. Mastersizer 3000), and is shown in the following Table 1.

4. Particle Size Distribution

A laser diffraction particle size analyzer (Malvern. Mastersizer 3000) was used to measure the particle size distribution of a 1 wt % silica particle aqueous solution to obtain a distribution diagram. A particle diameter corresponding to 50% of a volume accumulation of the particle size distribution was set as Dv(50) and is shown in the following Table 1, and the particle size distribution diagram of the silica particles of Example 1 is shown in FIG. 1.

A value of difference between a maximum particle diameter and a minimum particle diameter at a maximum value in the particle size distribution was defined as full width at half maximum (FWHM), a value of difference between a maximum particle diameter and a minimum particle diameter at 25% of a maximum value in the particle size distribution was defined as full width at quarter maximum (FWQM), and a ratio thereof (FWQM/FWHM) was calculated and is shown in the following Table 1.

5. Haze and Surface Appearance

The haze of a film (thickness: 100±1 μm) was measured with a Hazemeter (NDH8000, Nippon Denshoku) in accordance with ASTM D1003.

In addition, the surface appearance of a film (thickness: 100±1 μm) produced by melting and extruding an ionomer composition was observed with the naked eye, bad elements such as gel, a fish eye, and unevenness on the surface were evaluated according to the following criteria, and the results are shown in the following Table 2.

◎ (excellent): surface having almost no fisheye or no gel and being smooth.

○ (good): surface having less than 5 fish eyes or gels in an area of 1 cm² and being even.

Δ (insufficient): surface having 5 to 20 fish eyes or gels in an area of 1 cm² and being somewhat uneven.

× (bad): surface having 20 or more fish eyes or gels in an area of 1 cm² and being very uneven.

6. Melt Flow Index (MFI) [g/10 min]

A melt flow index (MFI) was measured at a temperature of 190° C. under the conditions of a loading of 2.16 kg in accordance with ASTM D1238. The measured values are listed in Table 3.

7. Coefficient of Friction (COF)

A maximum coefficient of static friction (p s) and a maximum coefficient of kinetic fraction (P d) were measured in accordance with ISO 8295. The measured values are listed in Table 3.

8. Wear Resistance Test

Wear resistance was measured in accordance with ASTM 4060, and a weight (mg) lost in 400 cycles was measured and is shown in the following Table 3. The smaller the weight was, the better the wear resistance was evaluated.

[Examples 1 to 8, and Comparative Examples 1 to 8] Preparation of Ionomer Composition An ionomer composition including 100 parts by weight of an ethylene acrylic acid ionomer (EAA, 9.7 wt % of acrylic acid) or an ethylene methacrylic acid ionomer (EMAA, 9 wt % of acrylic acid) and 0.2 parts by weight of silica particles having the physical properties of the following Table 1 was added to a twin-screw reaction extruder, and was melted and extruded at 180° C. at 300 rpm to produce an ionomer film.

TABLE 1

| Silica particles | [1] | [2] | [3] | [4] | [5] | [6] | [7] | [8] |
|---|---|---|---|---|---|---|---|---|
| pH | 3.7 | 5.3 | 4.4 | 5.8 | 6.2 | 7.7 | 7.1 | 5.8 |
| Bulk density | 0.17 | 0.13 | 0.11 | 0.19 | 0.31 | 0.08 | 0.23 | 0.30 |
| Pore volume | 1 | 0.8 | 1.6 | 1.6 | 0.6 | 1.6 | 0.6 | 0.6 |
| Effective area | 2029 | 2132 | 2312 | 2007 | 2083 | 2337 | 2880 | 1939 |
| Dv (50) | 3.81 | 2.17 | 2.68 | 2.1 | 4.03 | 2.86 | 2.5 | 4.51 |
| Equation 1 | 0.1294 | 0.1729 | 0.2582 | 0.3796 | 0.0715 | 0.2394 | 0.0833 | 0.0686 |
| FWHM | 7.26 | 7.3 | 8.00 | 7.8 | 7.91 | 4.05 | 3.98 | 7.25 |

TABLE 1-continued

| Silica particles | [1] | [2] | [3] | [4] | [5] | [6] | [7] | [8] |
|---|---|---|---|---|---|---|---|---|
| FWQM | 9.72 | 9.8 | 9.11 | 10.8 | 10.86 | 5.84 | 5.49 | 10.46 |
| FWHM/FWQM | 1.339 | 1.581 | 1.222 | 1.625 | 1.373 | 1.442 | 1.379 | 1.443 |

TABLE 2

| | Ionomer composition | | Evaluation of physical properties | |
|---|---|---|---|---|
| | Ionomer | Silica particles | Haze [%] | Surface appearance |
| Example 1 | EAA | [1] | 11.2 | ◎ |
| Example 2 | EMAA | [1] | 11.9 | ◎ |
| Example 3 | EAA | [2] | 11.7 | ◎ |
| Example 4 | EMAA | [2] | 12.3 | ○ |
| Example 5 | EAA | [3] | 12.5 | ○ |
| Example 6 | EMAA | [3] | 13.2 | ○ |
| Example 7 | EAA | [4] | 14.8 | Δ |
| Example 8 | EMAA | [4] | 15.3 | Δ |
| Comparative Example 1 | EAA | [5] | 17.5 | ○ |
| Comparative Example 2 | EMAA | [5] | 18.9 | ○ |
| Comparative Example 3 | EAA | [6] | 7.0 | X |
| Comparative Example 4 | EMAA | [6] | 7.0 | X |
| Comparative Example 5 | EAA | [7] | 16.5 | ○ |
| Comparative Example 6 | EMAA | [7] | 17.3 | ○ |
| Comparative Example 7 | EAA | [8] | 16.6 | Δ |
| Comparative Example 8 | EMAA | [8] | 18.3 | ○ |

As seen in Tables 1 and 2, the ionomer composition of the examples including the silica particles satisfying Equation 1 showed a lower haze and better surface appearance than the composition of the comparative examples. Thus, it was confirmed that a film produced using the ionomer composition according to an exemplary embodiment had well-improved surface appearance such as transparency. In particular, the haze of the ionomer composition satisfying Equation 1, or Equation 2, or Equation 3 was measured lower, and the surface appearance thereof was excellent. In addition, it was confirmed from the comparison of Example 5 and Comparative Example 3 that even in the case of the silica particles having similar physical properties, when their pH was acidic, the surface appearance was excellent.

[Example 9 and Comparative Example 9]
Preparation of Ionomer Composition An ionomer composition including 96 wt % of an ethylene acrylic acid ionomer (13.5 wt % of acrylic acid), 3 wt % of sodium carbonate ($Na_2CO_3$), 0.6 wt % of oleyl palmitamide, 0.2 wt % of behenamide, and 0.2 wt % of [1] or [5] of the silica particles of Table 1 was added to a twin-screw reaction extruder, and was melted and extruded at 180° C. at 300 rpm to produce a film having a thickness of 100 μm.

TABLE 3

| | Silica particles | MFI | Haze [%] | $\mu_s$ | $\mu_d$ | Wear resistance |
|---|---|---|---|---|---|---|
| Example 9 | [1] | 2.9 | 9.1 | 0.18 | 0.14 | −36.2 |
| Comparative Example 9 | [5] | 3.7 | 19.7 | 0.24 | 0.22 | −43.2 |

Figure 2:
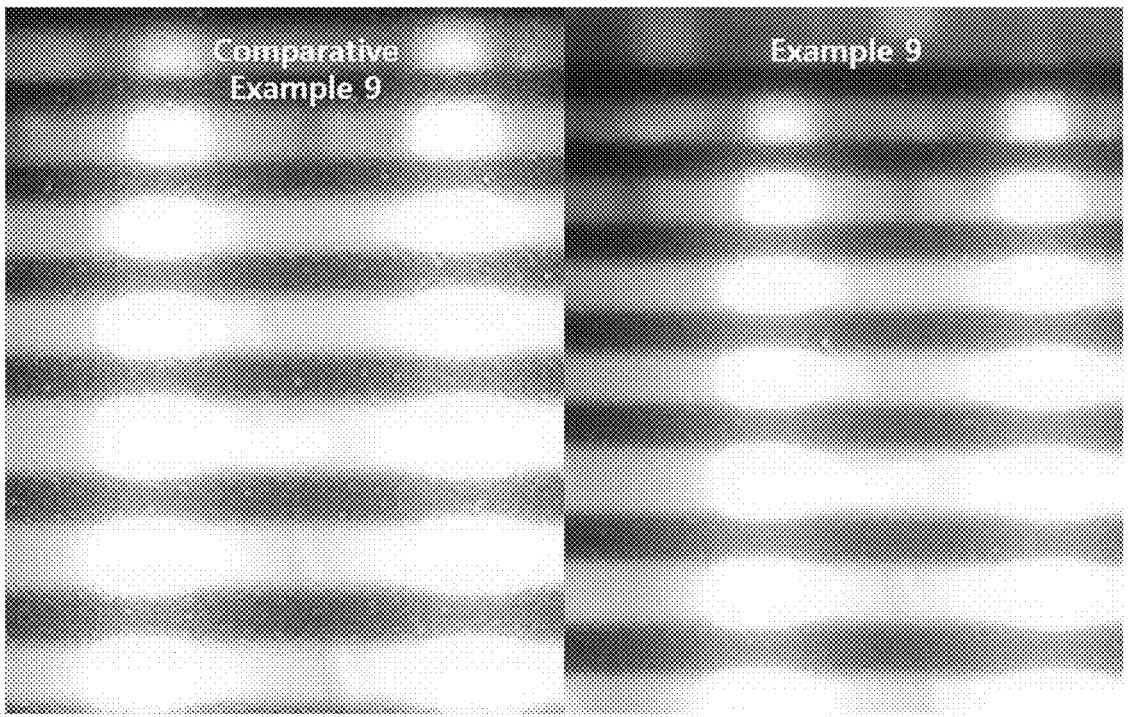
FIG. 2 is an image in which film appearances of Example 9 and Comparative Example 9 were observed.

The ionomer composition of Example 9 including the silica particles [1] and the ionomer composition of Comparative Example 9 including the silica particles [5] were melted and extruded to produce ionomer films having a thickness of 100 μm, and the surfaces of the films were compared, which is shown in FIG. 2. In FIG. 2, it was observed that the film of Example 9 had a smooth surface and had significantly fewer bad elements such as fish eyes, seeds, gels, and the like than the film of Comparative Example 9. In addition, as a result of measuring Gel area GI200 (Gel Index, measuring the sum of areas of all defects having a diameter of 200 um or more using a film appearance inspector (OCS from OCS GmbH)) of the ionomer films according to Example 9 and Comparative Example 9, it was confirmed that the film produced using the ionomer composition according to an exemplary embodiment was able to show better surface appearance, in that GI200 of Example 9 was shown to be 24.6 and GI200 of Comparative Example 9 was shown to be 105.8.

In addition, as seen in Table 3, it was confirmed that the ionomer film of Example 9 had a lower haze and better coefficient of friction and wear resistance test result value than Comparative Example 9, and thus, the film produced using the ionomer composition according to an exemplary embodiment had a minimized increase in haze to have excellent transparency and had a low coefficient of friction to have excellent slipperiness and easily secure stable film processability, and furthermore, had excellent surface appearance to be applied to a use where visual appeal is important and had excellent mechanical properties such as wear resistance to be applied to appearance.

The present disclosure relates to an ionomer composition including silica particles which are acidic in an aqueous solution state, and the composition has excellent miscibility, well-improved surface appearance such as transparency when produced into a film, and significantly improved wear resistance, coefficient of friction, and the like of the film.

Hereinabove, although the present invention has been described by specified matters and specific exemplary embodiments, they have been provided only for assisting in the entire understanding of the present invention. Therefore, the present disclosure is not by the specific matters limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

The invention claimed is:

1. An ionomer composition comprising: an ethylene-(meth)acrylic acid ionomer and silica particles, wherein an aqueous solution comprising the silica particles at a concentration of 50 mg/ml has an acidic pH, and the silica particles satisfy the following Equation 1:

$$\frac{V_{pore}}{A \times Dv(50)} \geq 0.1 \qquad \text{[Equation 1]}$$

wherein $V_{pore}$ is a pore volume (ml/g), A is an effective area (m$^2$/kg), and Dv(50) is a particle diameter (μm) corresponding to 50% of volume accumulation of a particle size distribution.

2. The ionomer composition of claim 1, wherein the silica particles have a ratio between FWHM and FWQM (FWQM/FWHM) of the particle size distribution of 1.5 or less.

3. The ionomer composition of claim 1, wherein the silica particles have Dv(50) of 1 to 10 μm.

4. The ionomer composition of claim 1, wherein the aqueous solution comprising the silica particles at a concentration of 50 mg/ml has a pH of 2 to 5.

5. The ionomer composition of claim 1, wherein the silica particles have a pore volume of 0.2 to 5 ml/g.

6. The ionomer composition of claim 1, wherein the silica particles have an effective area of 2000 to 2500 m$^2$/kg.

7. The ionomer composition of claim 1, wherein the silica particles have a bulk density of 0.02 to 5 g/ml.

8. The ionomer composition of claim 1, wherein the silica particles are comprised at 0.1 to 0.5 wt % with respect to a total weight of the ionomer composition.

9. The ionomer composition of claim 1, wherein the ethylene-(meth)acrylic acid ionomer comprises 5 to 15 wt % of a (meth)acrylic acid repeating unit.

10. The ionomer composition of claim 1, wherein the ethylene-(meth)acrylic acid ionomer has a degree of neutralization by one or two or more metals selected from the group consisting of lithium, sodium, potassium, calcium, magnesium, manganese, cobalt, nickel, copper, zinc, and lead of 25 to 60%.

11. The ionomer composition of claim 1, wherein a melt flow index of the ethylene-(meth)acrylic acid ionomer composition is 1 to 10 g/10 min as measured in accordance with ISO 1133-1 (2011).

12. An ionomer film produced from the ionomer composition of claim 1.

13. The ionomer film of claim 12, wherein the film has a maximum coefficient of static friction ($\mu_s$) of 0.2 or less as measured in accordance with ISO 8295.

14. The ionomer film of claim 12, wherein the film has a wear resistance test result value of 40 mg or less as measured in accordance with ASTM 4060.

15. The ionomer film of claim 12, wherein the film has a haze of 15% or less as measured in accordance with ASTM D1003.

* * * * *